May 12, 1942.  A. M. CRAVATH  2,282,396
WATTMETER
Filed Dec. 26, 1940

INVENTOR
Austin M. Cravath.
BY
HIS ATTORNEY

Patented May 12, 1942

2,282,396

UNITED STATES PATENT OFFICE 2,282,396

WATTMETER

Austin M. Cravath, San Francisco, Calif., assignor to The Union Switch and Signal Company, Swissvale, Pa., a corporation of Pennsylvania Application December 26, 1940, Serial No. 371,673

19 Claims. (Cl. 171—95)

My invention relates to wattmeters and more particularly to indicating wattmeters which are capable of accurately measuring small amounts of power in high frequency circuits.

One object of my invention is to provide an instrument of the above character having the ruggedness and simplicity of the usual sensitive direct current voltmeter or ammeter of the D'Arsonval type. Another object of my invention is to provide an instrument of this character which will accurately measure small amounts of power and whose accuracy will be very high both when the frequency of the supply circuit is low and when it is high. A further object of my invention is to provide an accurate indication of the average power by means of the usual D'Arsonval galvanometer type of instrument such as a voltmeter or ammeter calibrated to indicate watts. A still further object of my invention is to provide an instrument which is relatively small, light-weight, and inexpensive to manufacture. Other objects, advantages and characteristic features of my invention will be apparent from the description which follows.

I accomplish the foregoing objects in one form of my invention by providing a normally balanced electrical ring or bridge arrangement comprising a current coil and a voltage coil interconnected by asymmetric units and having a D'Arsonval type direct current instrument connected between the mid-points of the two coils. In other forms of my invention I accomplish the foregoing objects by providing a normally balanced asymmetric unit bridge or ring either with a voltage coil and current divider, or consisting entirely of asymmetric units, with no windings being used except for the meter coil.

I shall describe five forms of apparatus embodying my invention and shall then point out the novel features thereof in claims.

Figure 1:
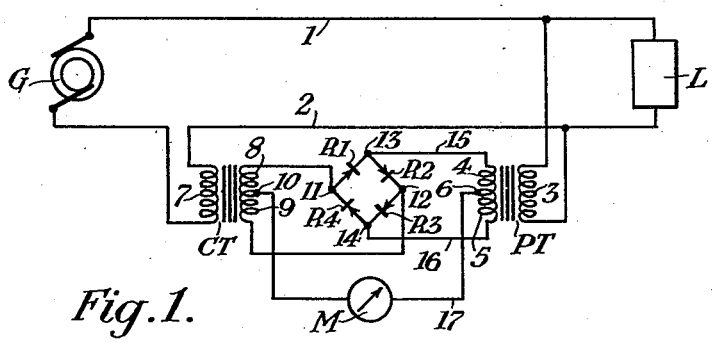

In the accompanying drawing, Fig. 1 is a diagrammatic view showing one form of apparatus embodying my invention. Figs. 2, 3, 4 and 5 are diagrammatic views showing modified forms of the apparatus of Fig. 1, also embodying my invention.

Similar reference characters refer to similar parts in each of the five views.

The usual indicating wattmeter is of the well-known dynamometer type and indicates average power with a satisfactory degree of accuracy provided that the frequency is not too high and the amount of power being measured is not too small. However, there is not now available, as far as I am aware, a high frequency wattmeter sufficiently sensitive to measure a very small amount of power, nor any instrument for indicating average power having the ruggedness and simple construction of the usual direct current type of meter. The apparatus embodying my invention is directed not only to providing a sensitive high frequency wattmeter but also to overcoming some of the shortcomings of the usual dynamometer type power indicating instrument.

Referring to Fig. 1 of the drawing, power is supplied from the source of alternating current shown as a generator G to a load L over a pair of supply wires 1 and 2. Connected across the supply wires near to the load L is the input winding 3 of a potential transformer PT which has a mid-tapped output winding comprising two substantially equal portions 4 and 5 connected at the mid-point 6. Connected in series with one of the supply wires is the input winding 7 of a current transformer CT having an output winding also comprising two substantially equal portions 8 and 9 connected together at the mid-point 10. The output winding of the current transformer CT is connected across one pair of terminals 11 and 12 of an asymmetric unit bridge or ring, whereas the output winding of the potential transformer is connected across the other pair of terminals 13 and 14 of the bridge. I prefer to employ copper oxide rectifiers as the asymmetric units because their characteristics are particularly well adapted for the purposes of my invention, but it will be clearly understood that any suitable asymmetric resistor which exhibits an appreciable change of resistance with current (preferably a linear change over the operating range of the instrument for maximum accuracy) may be used, as well. A suitable indicating instrument M which may be of the D'Arsonval galvanometer type is connected across the mid-points 6 and 10 of the output windings of the potential and current transformers.

Considering now the operation of the apparatus of Fig. 1, if either the potential or current transformer alone is energized, there will be no indication provided by the meter M since no current whatever, either alternating or direct, will flow through the meter, assuming of course that the four units R1, R2, R3, and R4 are substantially identical as to electrical characteristics. This is readily apparent from a consideration of the symmetry of the arrangement since at any instant there is more reason for current to flow in one direction through meter M than in the other direction, as will be obvious from an inspection of the circuit. In other words, if at any instant the input to the potential transformer PT is zero, the circuit is balanced so that an input to the current transformer CT will produce no current in meter M. Conversely, if the input to the current transformer CT is zero, an input to the potential transformer PT will not cause a deflection of the meter, since the bridge is symmetrical when viewed either from the potential terminals or the current terminals.

Assuming now that the potential transformer PT is energized, a current from this transformer will unbalance the ring so that if the instantaneous current is assumed to flow from 13 to 14, rectifiers R2 and R3 carry current in the forward direction and so will have their resistances reduced because of the negative resistance-voltage or resistance-current characteristic of the copper oxide rectifier, and rectifiers R1 and R4 will have their resistances increased because these carry current in their reverse or high resistance direction. Tracing the path from point 12, through rectifiers R2 and R3 in parallel, wires 15 and 16 and portions 4 and 5 of the output winding in opposite directions, it is found that the reactances cancel out. Continuing this path through point 6, wire 17, meter M, and point 10, it is found that the path through the lower half 9 of the output winding of transformer CT back to point 12 has a lower resistance because of the decreased resistance of rectifiers R2 and R3 (and increased resistance of rectifiers R1 and R4) than the opposing path from point 11, through rectifiers R1 and R4 in parallel, wires 15 and 16, winding portions 4 and 5 in opposite directions, point 6, wire 17, meter M, point 10, and the upper half 8 of the output winding of transformer CT, back to point 11. Hence, if the current transformer CT is now also energized, this simultaneous energization of the two transformers will produce a current through the meter M.

Another way to explain the foregoing operation is to consider that with the transformer PT alone energized, even though at a given instant the resistance of the individual units R2 and R3 is lower than that of units R1 and R4, the points 11 and 12 are at the same potential because each is located half-way with respect to the voltage impressed across the terminals 13 and 14 by the potential transformer. Accordingly, no current can flow either in the output winding of transformer CT (with this transformer deenergized) or in the circuit of the meter M. When the current transformer is energized, however, with the bridge unbalanced in the above manner, current will flow in the output winding of transformer CT and a difference of potential will exist between the mid-points 6 and 10 of the two output windings, so that a current will flow through the meter M.

The currents in the rectifier ring are kept so small that the percentage change in the rectifier resistance is likewise small. Accordingly, the current produced in the meter M at any instant is proportional to the degree of unbalance caused by the current from the potential transformer PT and it is also proportional to the current fed into this unbalanced circuit from the current transformer CT. Since the rectifiers are so chosen that the changes in rectifier resistances are proportional to the small currents from the potential transformer which produce them, the degree of unbalance is proportional to the potential effective across the load L. The current from the transformer CT is, of course, proportional to the load current. Accordingly, the current through the meter M at any instant is proportional to the instantaneous load power, and the average current through M for the complete cycle is proportional to the average power which is the quantity indicated by the instrument.

In summarizing the foregoing operation, it can be said that the currents which flow in the rectifier ring due to one power component, such as the voltage, cause unbalance of the ring so that another current which unit power current forces through another path with the meter M in series is proportional to the voltage component of the power. The meter indication is thus directly proportional to two factors: the voltage applied to the voltage terminals of the meter, and the number of units of current flowing through the current winding. Since this is true for any instantaneous values, the meter if sufficiently damped will indicate average power. If the meter has reactance, this will affect only the instantaneous current through the meter since, as is well known, reactance does not affect the average or D. C. current, so that the reading will not be affected.

In order to provide a high degree of accuracy in the apparatus of Fig. 1, the resistance-current curve of the copper oxide rectifiers at the point where it crosses the axis of zero current should be substantially linear. By sufficiently restricting the segment of the curve over which operation takes place, an approach just as close to linearity as desired may be obtained in practice. While an asymmetric unit having the negative resistance-voltage characteristic of the copper oxide rectifier is desirable, the invention is not limited to the negative slope characteristic, as an asymmetric unit having a positive slope characteristic, preferably linear over the operating range, may also be used. It is understood that the response of the unit to a change in voltage must be substantially instantaneous when high frequencies are used.

In general, the meter circuit must be balanced for at least one of the two inputs, which may be either potential or current, so that this input no matter how large will produce substantially no current in the meter. When this is accomplished, the circuit need only be balanced for the zero value of the other input, but can be unbalanced for values of this input differing from zero without producing a meter deflection when this input alone is effective. These balances need not be extremely accurate because the principal effect of unbalance is to cause some alternating current to flow through the meter but this does not affect the deflection.

Figure 2:
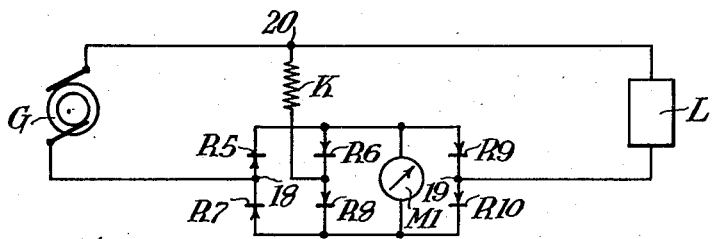

The principles upon which the operation of Fig. 1 is based can be applied in other ways to provide a sensitive high frequency wattmeter. One such arrangement is shown in Fig. 2. In this figure as in Fig. 1, an alternating current generator G supplies power to a load L over a line circuit into which is introduced the novel wattmeter embodying my invention. The asymmetric units or copper oxide rectifiers R5 to R10, inclusive, are all substantially identical as to their electrical characteristics in order that the instrument may be balanced at zero input. The potential terminals of the instrument are 19 and 20, whereas 18 and 19 are the current terminals.

When the current taken by the load L is zero, the potential input from point 20 through the multiplying resistor K produces equal voltages across the rectifiers R5, R6, R7, and R8, and zero current will flow in the meter M1 and in rectifiers R9 and R10. Also, when the potential across the terminals 19 and 20 is zero, the current through the resistor K (the resistance of which should be substantially greater than that of the rectifier units) will be so small that it can be neglected at this point, though this current may necessitate a small correction, in practice. Accordingly, rectifiers R6 and R8 behave merely as a shunt across the meter M1, and the bridge R5, R9, R10, and R7 is obviously balanced so that a load current acting alone will produce zero current through the meter. When a potential input does exist, however, the current which flows through the resistor K changes the resistances of the rectifier bridge arms R5, R9, R10, and R7 in such a direction that all of these changes cooperate to produce an unbalance. Accordingly, a load current will now produce a current through the meter M1 which is proportional to both the load current and the load potential, as in Fig. 1, thus indicating power.

As compared with the apparatus of Fig. 1, the apparatus of Fig. 2 has the advantage of being even less expensive to construct and being less susceptible to errors due to frequency since it requires no transformers. Also, the apparatus of Fig. 2 has the further advantage that it may be calibrated and used on either alternating or direct current.

Figure 3:
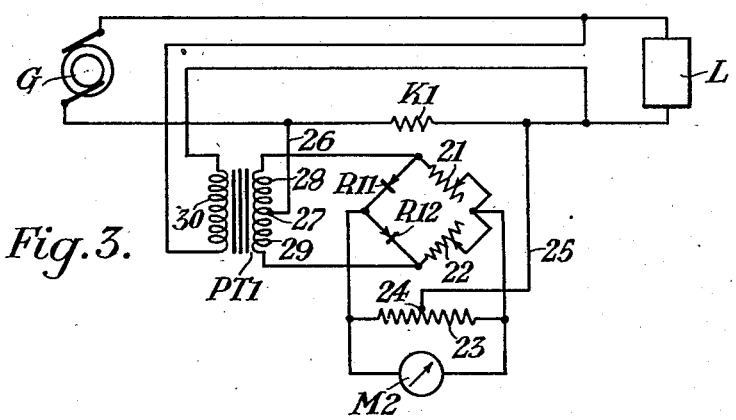

Referring now to Fig. 3, I have shown in this figure a further modification of the apparatus of Fig. 1 in which only two rectifiers are used, the bridge or ring being completed by suitable resistors of the usual type. The bridge comprises the copper oxide rectifiers R11 and R12 in one path and the resistors 21 and 22 in the other path, the zero current resistances of each of these rectifiers and resistors being equal. Resistor K1 is a multiplying shunt resistor which carries most of the load current, whereas resistor 23 carries the remaining current and is connected across the bridge in shunt with the meter M2. The resistor 23 has a mid-tap 24 to which the current lead 25 is connected. This resistor should preferably have a value approximately equal to the impedance of the output winding of the transformer PT1, although this value is not critical. The other current lead 26 is connected to the mid-point 27 of the output winding of the potential transformer PT1 which has its input winding 30 connected across the power supply circuit at the load. The mid-points 24 and 27 are the electrical neutral points of the bridge or ring.

If the potential across the transformer PT1 is zero, the rectifiers R11 and R12 are effectively connected in parallel and likewise the resistors 21 and 22 are effectively parallel. These rectifiers and resistors, respectively, form two arms of a Wheatstone bridge, the other two arms of which are the two halves of the resistor 23. The input to this bridge is that fraction of the load current which is carried by wires 26 and 25. The bridge is obviously balanced, so that no current will flow through the meter unless the currents are so large as to alter the resistances of the rectifiers. However, even if the rectifier resistances are altered somewhat, the changes are equal and opposite in the two rectifiers. Hence, the resultant resistance of the two rectifier branches in parallel is substantially unaltered, except possibly for a very small change, so that the bridge remains balanced.

If the current input is zero, there is obviously a balance such that even a relatively large potential input to the transformer PT1, and one which alters the resistances of the rectifiers R11 and R12, will not produce any current in the meter M2. Ordinarily, the potential input is such as will alter the rectifier resistances so that the balance for current input is destroyed, whereupon if a current input is now introduced, a current will flow in the meter M, thus producing a deflection which is proportional to both the potential and load current, or in other words, to the power taken by the load L.

In Fig. 3, I have shown a wattmeter in which only two rectifiers are used. There are also other ways in which this apparatus can be organized to provide a watt indication by means of a simple direct current meter and but one pair of rectifiers, two such ways being shown in Figs. 4 and 5. In analyzing the fundamental operation of the circuits shown in this disclosure, it appears that the essential requirements for a wattmeter of the type herein disclosed are: first, at least two rectifiers so connected that they produce equal opposing currents through the meter when either current or potential input alone is effective; and second, the paths through the rectifiers for both the current input and the potential input must be in the same direction for the rectifiers which produce direct current in one direction through the meter, and in opposite directions for the rectifiers which produce direct current in the opposite direction through the meter.

The simplest way in which the above conditions can be satisfied is to use pairs of rectifiers connected to the meter in symmetrical opposition. The circuit can be so arranged that the components of the rectifier alternating current which are due to the load current input oppose one another, whereas the components due to the potential input aid one another; or, the circuit can be arranged in the reverse manner wherein the current input components will aid and the potential input components will oppose one another. In either case, the meter reading will be proportional to the product of the load current and load potential, as required.

Figure 4:
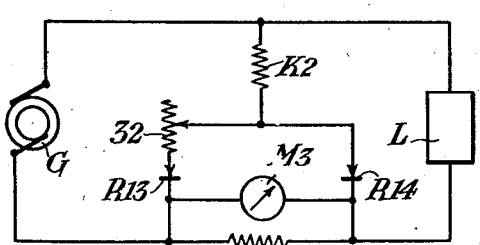

Referring now to Fig. 4, the wattmeter of this figure employs only two rectifiers, as in Fig. 3, but makes use of a more simple circuit in which, however, alternating current is present in the meter under certain conditions, and does not vanish as it does in Figs. 1, 2, and 3. Since it is only necessary for the direct current to vanish, under certain conditions, the presence of the alternating current is unobjectionable for my purposes. In Fig. 4, the generator G supplies current to the load L through the resistor 31 which supplies the current input to the meter M3. The potential input to the meter is supplied over the multiplying resistor K2 and the rectifiers R13 and R14 in parallel. The resistor 32 may be used to compensate for the slight lack of symmetry in the two current paths through the rectifiers due to the potential input, this dissymmetry being caused by the presence of resistor 31 in one of the paths or by slight inequalities in the rectifiers themselves. Resistor 31 should preferably have a low ohmic value as compared with that of the multiplying resistor K2.

Since the meter M3 is connected directly across the terminals of the resistor 31, alternating current will flow through the meter whenever load current is being supplied because of the alternating potential drop developed across resistor 31. This alternating current will not, however, affect the indication of meter M3 in any appreciable manner because this meter is designed to respond only to direct current. The meter alternating current will vanish when the load current is zero. No alternating current will flow in the meter due to the potential input because the voltage drops in the rectifiers R13 and R14 will be substantially equal so that no appreciable alternating potential difference will exist across the meter terminals. As a matter of fact, with the load current zero, a slight alternating as well as unidirectional voltage drop will exist across resistor 31, but this will be due only to a portion of the potential input current and can be made quite small in relation to the unbalanced drop which causes a meter reading, so that its effect can be neglected.

In operation, during the half-cycle when the upper terminal of the generator is positive, the current which flows due to the potential input will flow downwardly or in the low resistance direction through both rectifiers R13 and R14 so that no appreciable direct current will flow in the meter due to the potential input alone. If the load current alone is present, then during the half-cycle when the right-hand terminal of resistor 31 is positive, the voltage drop due to the load current will cause current to flow upwardly or in the reverse direction through rectifier R14, and downwardly in the aiding direction through rectifier R13. Thus, the flow of load current destroys the symmetry of the two rectifier paths by increasing the resistance of rectifier R14 and decreasing the resistance of rectifier R13 so that if now a potential input is added, the voltage drops across the rectifiers due to the potential input will be unequal and a net unidirectional current will flow through the meter M3, this current being proportional both to the load potential and to the degree of rectifier unbalance, or load current. No reading will be given by the meter when the load current input acts alone since the current which tends to flow in one direction through the meter during one half-cycle will be offset by the current which tends to flow in the opposite direction through the meter during the other half-cycle. During the half-cycle when the lower terminal of the generator is positive, the left-hand terminal of resistor 31 will be positive so that the resistance of rectifier R13 will be increased and that of rectifier R14 will be decreased. However, during this same half-cycle, the polarity of the current due to the potential input will also reverse, so that if the potential input is effective, the current through the meter M3 will again be in the same direction as before. Accordingly, the meter will indicate power as long as both the potential input and current input are effective but will provide no indication when either input alone is present.

Figure 5:
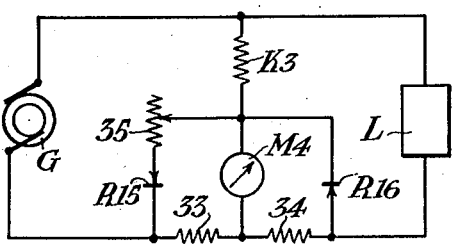

A further modification of the apparatus, in which the alternating current is balanced out of the meter when load current alone is effective, is shown in Fig. 5. In this figure, some alternating current will be present in the meter whenever a potential input is effective, and this alternating current will vanish only when the load potential is zero. The current input resistor is divided into two substantially equal portions 33 and 34 which form two arms of the bridge, the rectifiers R15 and R16 comprising the other two arms. The potential input is conducted into the bridge by means of the multiplying resistor K3, as in the previous figures, and the meter M4 is connected across the junction points of the two resistors and the two rectifiers. The compensating resistor 35 can be used to adjust for any initial dissymmetry in the apparatus.

Assuming that there is no potential input to the meter M4 but that current is being supplied to the load, the voltage drop in each of resistors 33 and 34 will be the same so that at any instant the currents in the meter will balance out since as much current will flow through the meter in one direction due to the drop across 33 as will flow through the meter in the opposite direction due to the drop across 34. The two rectifiers will remain balanced because whatever change in resistance may occur due to the current input will be the same in both. Accordingly, no direct current will flow in meter M4 when current input alone is effective. A potential input acting alone will likewise produce no reading on the meter because the currents which tend to flow in the meter under this condition will be of opposite polarity for the two half-cycles so that the effect will be cancelled out.

Assuming that the upper terminal of generator G is positive, then during this half-cycle the current due to the potential input will flow in the aiding direction in rectifier R15 and in the opposing direction in rectifier R16 so that symmetry of the bridge will be destroyed. If a load current input is simultaneously effective, then the currents due to the voltage drops across resistors 33 and 34 will encounter different resistances and a net unidirectional current proportional to both the potential and the current input will flow through the meter M4, thus providing a power indication. During the other half-cycle, the bridge will be unbalanced in the reverse direction, but since the voltage drops across resistors 33 and 34 will also be reversed, the current in the meter will continue in the same direction as before.

Since in each of Figs. 4 and 5 the alternating current is not completely balanced out of the meter under certain conditions, some unidirectional current will flow through the meter with only one of the two inputs effective, should a direct current source be substituted for the alternating current generator G. Accordingly, the apparatus of Figs. 4 and 5 should be used only in alternating current circuits.

Although I have described my invention as being particularly useful for measuring power in circuits carrying currents at high frequencies and for measuring small amounts of power such as are difficult to measure accurately by present-day commercial wattmeters, it will be understood that my invention is not limited to high frequency service or to low-power measurement. Apparatus embodying my invention will measure large amounts of power at low frequencies equally well, and in certain modifications thereof, will measure either alternating or direct current power by means of a simple D'Arsonval type of instrument. It will also be understood that although I prefer to use asymmetric or resistance units of the copper oxide type because of the desirable resistance characteristics of these units, my invention is not limited to the use of copper oxide rectifiers as, obviously, any suitable asymmetric unit which exhibits the desired change of resistance with the current flowing therethrough may be used as well, and my invention contemplates such use.

Although I have herein shown and described only five forms of wattmeter embodying my invention, it is understood that various changes and modifications may be made therein within the scope of the appended claims without departing from the spirit and scope of my invention.

Having thus described my invention, what I claim is:

1. In combination with a source of periodic current and a load receiving current from said source, a copper oxide rectifier ring comprising four copper oxide units having substantially equal electrical characteristics, said units exhibiting a substantially linear change in resistance with current over their operating range, a current transformer having its input winding connected in series with said load and having its output winding connected across one pair of diagonally opposite terminals of said ring, a potential transformer having its input winding connected across said load and having its output winding connected across the other pair of diagonally opposite terminals of said ring, and a voltage responsive instrument connected across the mid-points of said two output windings.

2. In combination with a source of periodic current and a load receiving current from said source, an electrical ring comprising four asymmetric units having substantially equal electrical characteristics, said units exhibiting a change of resistance with current which is substantially linear over their operating range, a first winding connected across one pair of diagonally opposite terminals of said ring, means for energizing said first winding in accordance with the current supplied to said load, a second winding connected across the other pair of diagonally opposite terminals of said ring, means for energizing said second winding in accordance with the load potential, and an electric meter energized by the difference of potential existing between the mid-points of said first and second windings.

3. Apparatus for measuring power comprising, in combination, an electrical ring including four asymmetric units having substantially equal electrical characteristics, said units exhibiting a change of resistance with current which is substantially linear over their operating range, a current responsive winding connected across one pair of diagonally opposite terminals of said ring, a potential responsive winding connected across the other pair of diagonally opposite terminals of said ring, and a voltage responsive instrument connected across the mid-points of said two windings.

4. Apparatus for measuring power comprising, in combination, an electrical ring including four copper oxide rectifier units having substantially equal electrical characteristics, a current responsive winding connected across one pair of diagonally opposite terminals of said ring, a potential responsive winding connected across the other pair of diagonally opposite terminals of said ring, and means for measuring the potential difference between the mid-points of said two windings, the parts being so proportioned that when either of said windings is energized alone the potential between said mid-points is substantially zero but departs therefrom when both said windings are simultaneously energized.

5. A wattmeter comprising, in combinaton, an electrical bridge including four resistance units having substantially equal resistance values at zero current, at least two consecutive units of said bridge having asymmetric properties, said consecutive units being poled in aiding relation in the ring formed by said bridge and exhibiting a change of resistance with current, a load potential responsive winding connected across one pair of diagonally opposite terminals of said bridge, a resistor connected across the other pair of diagonally opposite terminals of said bridge, load current responsive means for applying a potential between the mid-point of said winding and the mid-point of said resistor, and a voltage responsive instrument connected across said other pair of terminals of said bridge.

6. Apparatus for measuring power comprising, in combination, an electrical ring including two copper oxide rectifier units and two ordinary resistance units all connected in series in said ring, all of said units having substantially equal resistance values at zero current, a load potential responsive winding connected across one pair of diagonally opposite terminals of said ring, means for impressing a potential which is proportional to the load current across the two electrical neutral points of said ring, one of said neutral points being the mid-point of said winding, and means for measuring the potential difference across the other pair of diagonally opposite terminals of said ring.

7. Apparatus for measuring power comprising, in combination, an electrical ring including two asymmetric units and two ordinary resistance units all connected in series in said ring, all of said units having substantially equal resistance values at zero current, said asymmetric units exhibiting a change of resistance with current, a load potential responsive winding connected across one pair of diagonally opposite terminals of said ring, means for impressing a potential which is proportional to the load current across the two electrical neutral points of said ring, one of said neutral points being the mid-point of said winding and the other neutral point being the mid-point of an impedance connected across the other pair of diagonally opposite terminals of said ring, and means for measuring the potential difference across said other pair of terminals of said ring.

8. In combination with a source of periodic current and a load receiving current from said source, an electrical ring including two copper oxide rectifier units and two ordinary resistance units all connected in series in said ring, each of said rectifier and resistance units having substantially equal resistance values at zero current, a potential transformer having its input winding connected across said load and having its output winding connected across one pair of diagonally opposite terminals of said ring, a first resistor included in the load circuit, a second resistor connected across the other pair of diagonally opposite terminals of said ring, means for applying the potential drop in said first resistor across the mid-points of said output winding and said second resistor, and means for measuring the potential difference across said other pair of terminals of said ring.

9. In combination with a pair of conductors and a load receiving current over said conductors, an electrical ring comprising four copper oxide rectifier units having substantially equal electrical characteristics, said ring being connected into one of said conductors by means of one pair of diagonally opposite terminals thereof, a pair of copper oxide rectifier units connected in series across the other pair of diagonally opposite terminals of said ring, both units of said pair being poled in the same direction and each having substantially the same electrical characteristics as the units of said ring, a resistor connected between the other of said conductors and the connection between the units of said pair, and a voltage responsive instrument connected across said other pair of terminals of said ring.

10. In combination with a pair of conductors and a load receiving current over said conductors, an electrical ring comprising four copper oxide rectifier units having substantially equal electrical characteristics, said ring being connected into one of said conductors by means of one pair of diagonally opposite terminals thereof, a pair of copper oxide rectifier units connected in series across the other pair of diagonally opposite terminals of said ring, both units of said pair being poled in the same direction and each having substantially the same electrical characteristics as the units of said ring, a resistor having a value substantially greater than the resistance of said rectifier units, said resistor being connected between the other of said conductors and the connection between the units of said pair, and a voltage responsive instrument connected across said other pair of terminals of said ring.

11. In combination with a pair of conductors and a load receiving current over said conductors, an electrical ring comprising four asymmetric units having substantially equal electrical characteristics, said ring being connected into one of said conductors by means of one pair of diagonally opposite terminals thereof, a pair of asymmetric units connected in series across the other pair of diagonally opposite terminals of said ring, both units of said pair being poled in the same direction and each having substantially the same resistance value as the units of said ring, all six of said units exhibiting a change of resistance with current, a resistor connected between the other of said conductors and the junction between said pair of units, and means for measuring the potential difference across said other pair of terminals of said ring.

12. In combination with a pair of conductors and a load receiving current over said conductors, an electrical ring comprising four asymmetric units having substantially equal electrical characteristics, said ring being connected into one of said conductors by means of one pair of diagonally opposite terminals thereof, said units exhibiting a change of resistance with current, a pair of resistance units connected in series across the other pair of diagonally opposite terminals of said ring, each unit of said pair having substantially the same resistance value as the zero current resistance of the units of said ring, a resistor connected between the other of said conductors and the junction between said pair of resistance units, and means for measuring the potential difference across said other pair of terminals of said ring.

13. A wattmeter comprising, in combination, an electrical ring including four asymmetric units having substantially equal electrical characteristics, means for conducting current into one pair of diagonally opposite terminals of said ring, a pair of asymmetric units connected in series across the other pair of diagonally opposite terminals of said ring, both units of said pair being poled in the same direction and each having substantially the same electrical characteristics as the units of said ring, all six of said units exhibiting a change of resistance with current, means for impressing a potential between the junction point of said pair of units and a terminal of said one pair of terminals of said ring, and means for measuring the potential difference across said other pair of terminals of said ring.

14. A wattmeter of the character described comprising, in combination, an electrical ring including four resistance units having substantially equal resistance values at zero current, at least two consecutive units of said ring having asymmetric properties and exhibiting a change of resistance with current, means for conducting current into said ring which is proportional to the load current for unbalancing said ring by virtue of the change in resistance of said asymmetric units whereby one path through the ring has a lower resistance than the other path, means for applying a potential proportional to the load potential across said ring in such manner that unequal currents flow in said two paths, and means for measuring the potential difference resulting from the flow of said unequal currents in said ring.

15. A wattmeter of the character described comprising, in combination, an electrical ring including four resistance units having substantially equal resistance values at zero current, at least two consecutive units of said ring having asymmetric properties, said two units being poled in the same direction and exhibiting a change of resistance with current, means for conducting current which is proportional to the load current into said ring at the junction between said asymmetric units for unbalancing the resistance of the two paths through the ring, means for applying a potential proportional to the load potential across said ring in such manner that unequal currents flow in said two paths, and means for measuring the potential difference resulting from the flow of said unequal currents in said ring.

16. A wattmeter of the character described comprising, in combination, an electrical ring comprising four copper oxide rectifier units having substantially equal electrical characteristics, means for conducting current into said ring by means of one pair of diagonally opposite terminals thereof, means for applying a potential across the other pair of diagonally opposite terminals of said ring, and means for measuring the potential difference between the two neutral points of the ring resulting from unbalance of said ring when current and potential are simultaneously applied to the respective terminals of said ring.

17. A wattmeter of the character described comprising, in combination, an electrical ring including four resistance units having substantially equal resistance values at zero current, at least two consecutive units of said ring having asymmetric properties and exhibiting a change of resistance with current, means for applying a potential proportional to the load potential across said ring in such manner as to unbalance said ring by virtue of the change in resistance of said asymmetric units whereby one path through the ring has a lower resistance than the other path, means for conducting current which is proportional to the load current into said ring, said current dividing unequally between said two paths, and means for measuring the potential difference resulting from the flow of said unequal currents in said ring.

18. A wattmeter of the character described comprising, in combination, an electrical ring including at least two asymmetric units having substantially equal electrical characteristics and exhibiting a change of resistance with current, means for applying a potential proportional to the load potential across said ring for unbalancing said ring by virtue of the change in resistance of said asymmetric units whereby one path through the ring has a lower resistance than the other path, means for conducting current into said ring which is proportional to the load current and which divides unequally between said two paths due to said unbalance, and means for measuring the potential difference resulting from the flow of said unequal currents in said ring.

19. A wattmeter of the character described comprising, in combination, an electrical ring including at least two asymmetric units having substantially equal electrical characteristics and exhibiting a change of resistance with current, means for applying a potential proportional to one factor of the load power across said two asymmetric units in parallel for unbalancing said ring by virtue of the change in resistance of said asymmetric units whereby one path through the ring has a lower resistance than the other path, means for conducting current into said ring which is proportional to the other factor of the load power and which divides unequally between said two paths due to said unbalance, and means for measuring the potential difference resulting from the flow of said unequal currents in said ring.

AUSTIN M. CRAVATH.